US005563471A

United States Patent [19]
Mitani

[11] Patent Number: 5,563,471
[45] Date of Patent: Oct. 8, 1996

[54] DISCHARGE TUBE

[75] Inventor: Tetsuya Mitani, Susono, Japan

[73] Assignee: Yazaki Corporation, Tokyo, Japan

[21] Appl. No.: 354,094

[22] Filed: Dec. 6, 1994

[30] Foreign Application Priority Data

Dec. 27, 1993 [JP] Japan .................................... 5-333890

[51] Int. Cl.[6] ............................ H01J 17/48; H01J 17/16; H01J 17/26; H02H 1/00

[52] U.S. Cl. .......................... 313/589; 361/120; 313/634; 313/231.11

[58] Field of Search .................................... 361/111, 112, 361/118, 119, 120, 220, 128, 130; 337/28, 29, 30, 31, 32, 33, 34; 313/589, 634, 231.11, 589

[56] References Cited

U.S. PATENT DOCUMENTS 5,080,083 1/1992 Sato ........................................ 123/627
5,336,970 8/1994 Einbinder ................................ 313/631
5,337,035 8/1994 Idei ........................................... 337/28
5,391,961 2/1995 Tsuchiya ................................ 313/634

FOREIGN PATENT DOCUMENTS 3-141574 6/1991 Japan .

*Primary Examiner*—Sandra L. O'Shea
*Assistant Examiner*—John Ning
*Attorney, Agent, or Firm*—Nikaido, Marmelstein, Murray & Oram LLP

[57] ABSTRACT

This invention provides a discharge tube which is small and easy to manufacture, which prevents the discharge characteristics from being disturbed by a grounded body located nearby, and which makes creeping discharges unlikely to occur and at the same time enhances the degree of freedom in incorporating the discharge tube into devices. The discharge tube of this invention has electrode plates fixed at the ends of the enclosure so that the electrode plates have their discharge electrodes protruding inwardly to face each other. The central portion of one of the electrode plates is bulged outwardly, and the discharge plane of the discharge electrode is located close to a plane including the periphery of the electrode plate.

7 Claims, 1 Drawing Sheet

DISCHARGE TUBE

BACKGROUND OF THE INVENTION

1. Field of the Invention

The present invention relates to a discharge tube and more particularly to a voltage control discharge tube used on laser equipment's starting gap switches, sharpener gaps and lightning arresters.

2. Description of the Prior Art

Among the discharge tubes that are used for laser equipment's starting gap switches, sharpener gaps and lightning arresters is one which includes two electrode plates disposed at both ends of an electrically insulating, cylindrical body in such a way as to face each other, with their discharge electrodes protruding inwardly. Such a discharge tube, however, has a drawback that because high voltages are impressed between the electrodes, the discharge characteristics easily vary because of influences from a grounded body present near the discharge tube.

To cope with this problem, an improvement has been proposed in Japanese Patent Preliminary Publication No. Heisei 3-141574, in which one of the electrodes of the discharge tube is enclosed by an enclosure, whose outer wall surface is provided with a conductive member to shield the electrode to maintain a stable discharge characteristic even when a grounded body comes near the discharge tube. This type of discharge tube, as shown in FIG. 3, has a conductive member 3 as a shield cover (hereinafter referred to simply as a shield) fitted to the outer wall surface of the enclosure 1 in such a way as to enclose the discharge electrode 2 to which a negative high voltage is applied, with the electrode plate 2*a* and the conductive member 3 interconnected.

With the discharge tube incorporating the above improvement, however, since the effective length L of the external wall surface of the enclosure decreases, the creeping discharge or flashover along the outer wall surface, indicated at D in the figure, becomes more likely to occur, so that it is necessary to elongate the effective length of the enclosure as shown by L1 in FIG. 4 to prevent the flashover. This reduces the degree of freedom of design because of restrictions in shape when incorporating the discharge tube into small devices. Further, the additional process of providing a conductive member to the enclosure increases the manufacture cost.

SUMMARY OF THE INVENTION

This invention has been accomplished to provide a discharge tube which is small and easy to manufacture, keeps the discharge characteristics from becoming unstable when subjected to the influences of a grounded nearby object, and which makes creeping discharge unlikely while at the same time having a high degree of freedom for incorporation into small devices.

The above objective can be achieved by the discharge tube which comprises: an enclosure and two electrode plates fixedly provided at opposite ends of the enclosure, the electrode plates each having a discharge electrode protruding inwardly so that the discharge electrodes face each other; wherein a first one of the electrode plates has a central portion thereof bulged outwardly and a discharge plane of the discharge electrode of the first electrode plate is located in or close to a plane including a periphery of the first electrode plate.

Instead of providing a conductive member on the outer wall surface of the enclosure so as to enclose one of the electrodes, an electrode on high-voltage side, the discharge tube of this invention has the central portion of the electrode plate bulged outwardly to set the discharge plane of the discharge electrode backward without increasing the length of the enclosure. This structure has the advantage of being able to maintain stable discharge characteristics as with the improved, conventional shielded discharge tube, and at the same time to make the creeping discharge unlikely to occur.

DETAILED DESCRIPTION OF PREFERRED EMBODIMENT

Figure 1:
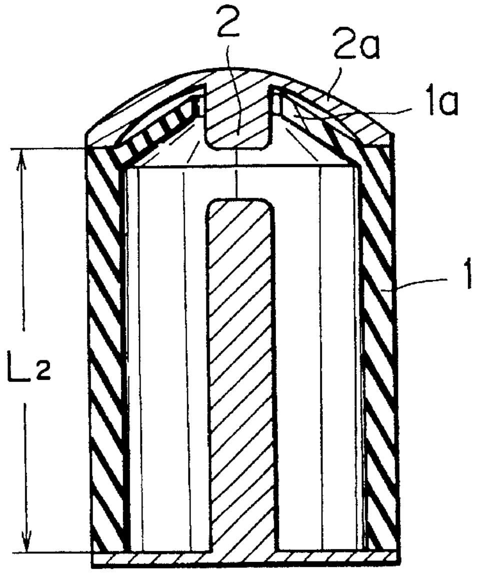
FIG. 1 is a cross section showing the structure of a discharge tube as a first embodiment of this invention.

One embodiment of the discharge tube of this invention is shown in FIG. 1. A metallic electrode plate 2*a* fused to an end of a cylindrical ceramic enclosure 1 by metal solder is formed by press into a dome-like shape that bulges outwardly. The discharge plane of a discharge electrode 2 is almost identical with a plane containing the circumference of the electrode plate 2*a* so that the discharge electrode 2 is shielded from influences of an earthed body close to the discharge tube. Because the effective length L2 of the enclosure 1 is equal to the length of the enclosure 1, the creeping discharge over the outer wall surface is unlikely to occur. Further, because the enclosure 1 has on the inner side of its end a ring-shaped projection 1*a* extending toward the discharge electrode 2, the creeping discharge can also be prevented over the inner surface of the enclosure 1.

Figure 2:
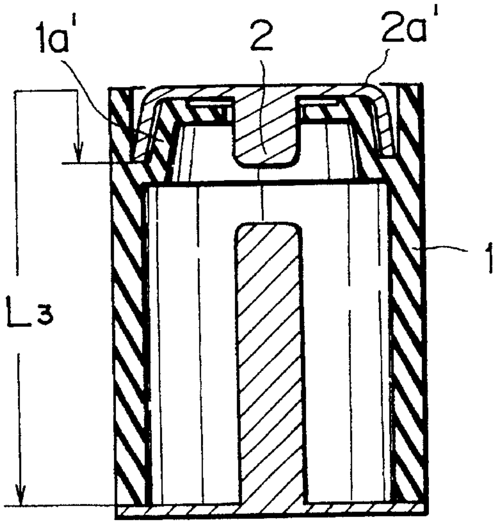
FIG. 2 is a cross section showing the structure of a discharge tube as a second embodiment of this invention.
Figure 4:
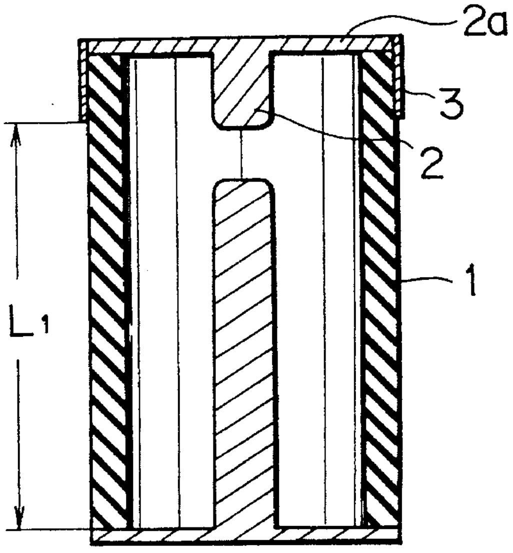
FIG. 4 PRIOR ART
FIG. 4 is a cross section showing the structure of a conventional discharge tube incorporating an improvement for preventing a creeping discharge.
Figure 3:
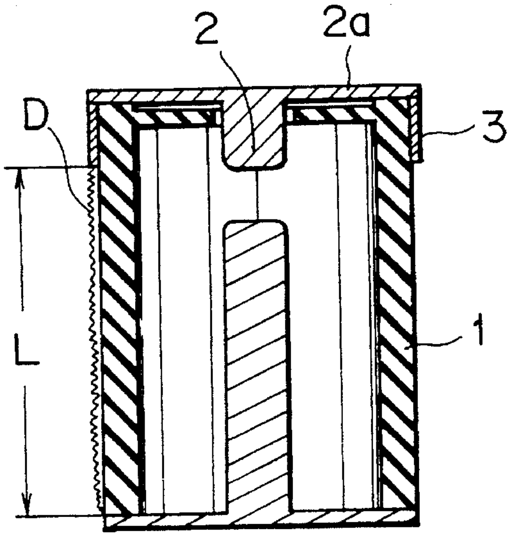
FIG. 3 PRIOR ART
FIG. 3 is a cross section showing the structure of a conventional discharge tube.

FIG. 2 shows another embodiment of the discharge tube according to this invention. In this embodiment, the ring-shaped projection 1*a*' provided on the inner side of the end of the enclosure 1 begins to extend inwardly at an inner circumference of the enclosure 1 some distance inward from the end of the enclosure 1 and is shaped like a truncated cone. The peripheral portion of the electrode plate 2*a*', which is also shaped like a truncated cone, is soldered to the upper surface of the base of the frustoconical ring-shaped projection 1*a*'—the bottom of a circular recess which is formed by the inner wall of the end portion of the enclosure and the outer surface of the conical portion of the ring-shaped projection. The electrode plate 2*a*' is pressed into a truncated cone shape and the discharge plane of the discharge electrode 2 is located in or close to a plane including the periphery of the electrode plate 2*a*'. In this example, not only is the effective length L3 of the outer wall surface of the enclosure 1 elongated but the effective length of the inner wall is also elongated. The actual dimension of the enclosure 1, however, does not increase. Although the size of the discharge tube is reduced, the creeping discharge along the outer and inner surfaces becomes more unlikely to occur. The shield effect for the discharge electrode 2 is sufficient.

The discharge tube of this invention has a large enough shield effect for the discharge electrode to protect the discharge characteristics of the discharge tube against influences of a grounded body located nearby. Furthermore, although the size of the discharge tube is small, the creeping discharge is unlikely to occur. These in turn enhance the design freedom in incorporating the discharge tube into small devices. Moreover, because the electrode plate and the shield conductor can be formed integrally, the assembly process becomes simple lowering the manufacture cost.

What is claimed is:

1. A discharge tube comprising:

an enclosure; and two electrode plates fixedly provided at opposite ends of said enclosure, said electrode plates each having a discharge electrode protruding inwardly so that the discharge electrodes face each other;

wherein a first one of said electrode plates has a central portion thereof bulged outwardly and an innermost point of the discharge electrode of said first electrode plate is essentially coplanar with an innermost edge of an outer periphery of said first electrode plate; and wherein the discharge electrode of a second one of said electrode plates is elongated in correspondence with the retracted discharge electrode of said first electrode plate.

2. A discharge tube according to claim 1, wherein said enclosure is cylindrical.

3. A discharge tube according to claim 1, wherein said first electrode plate is generally dome-shaped.

4. A discharge tube according to claim 1, further comprising a ring-shaped projection extending from an inner surface of said enclosure substantially in parallel with an inner surface of said first electrode plate to a position close to the discharge electrode of said first electrode plate.

5. A discharge tube according to claim 1, wherein said first electrode plate is frustoconical, with a base portion thereof located at a distance inward from an end surface of said enclosure such that an outermost major surface of said first electrode plate is located in or close to a plane including said end surface.

6. A discharge tube according to claim 5, further comprising a ring-shaped projection, substantially frustoconical in shape, extending from an inner surface of said enclosure substantially in parallel with an inner surface of said first electrode plate to a position close to the discharge electrode of said first electrode plate.

7. A discharge tube according to claim 6, wherein said ring-shaped projection includes a radially-extended base through which said ring-shaped projection is integrally connected to said inner surface of the enclosure, said first electrode plate having a peripheral portion thereof supported on said base of the ring-shaped projection.

* * * * *